(12) United States Patent
Haustein et al.

(10) Patent No.: US 8,719,676 B2
(45) Date of Patent: May 6, 2014

(54) COMMUNICATION NETWORK ELEMENT AND METHOD FOR TRANSMITTING DATA

(75) Inventors: Thomas Haustein, Potsdam (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 243 days.

(21) Appl. No.: 13/057,010

(22) PCT Filed: Aug. 4, 2009

(86) PCT No.: PCT/EP2009/060099
§ 371 (c)(1),
(2), (4) Date: Feb. 1, 2011

(87) PCT Pub. No.: WO2010/015629
PCT Pub. Date: Feb. 11, 2010

(65) Prior Publication Data
US 2011/0138245 A1    Jun. 9, 2011

(30) Foreign Application Priority Data
Aug. 5, 2008  (EP) .................................. 08104961

(51) Int. Cl.
*H03M 13/00* (2006.01)

(52) U.S. Cl.
USPC ........................ 714/776; 714/758; 714/799

(58) Field of Classification Search
USPC ............. 714/776, 758, 41, 48, 703, 799, 748
See application file for complete search history.

(56) References Cited

U.S. PATENT DOCUMENTS

| | | | | |
|---|---|---|---|---|
| 6,307,868 | B1 * | 10/2001 | Rakib et al. .................... | 370/485 |
| 6,741,554 | B2 | 5/2004 | D'Amico et al. .............. | 370/225 |
| 7,093,178 | B2 * | 8/2006 | Kim et al. ...................... | 714/748 |
| 7,106,715 | B1 * | 9/2006 | Kelton et al. .................. | 370/338 |
| 7,315,898 | B2 * | 1/2008 | Kohno ............................ | 709/230 |
| 7,339,650 | B2 * | 3/2008 | Coon et al. ....................... | 355/30 |
| 2003/0120802 | A1 * | 6/2003 | Kohno ............................ | 709/237 |
| 2008/0052603 | A1 * | 2/2008 | Wiatrowski et al. .......... | 714/776 |

FOREIGN PATENT DOCUMENTS

| | | |
|---|---|---|
| CN | 1675865 A | 9/2005 |
| EP | 1 826 939 A1 | 8/2007 |
| EP | 1 843 484 A1 | 10/2007 |
| EP | 2 015 495 A1 | 1/2009 |
| WO | WO-2007/117100 A1 | 10/2007 |
| WO | WO 2007/129617 A1 | 11/2007 |

OTHER PUBLICATIONS

Jiang, D., et al., "Principle and Performance of Semi-persistent Scheduling for VoIP in LTE System", © 2007 IEEE, 4 pgs.

* cited by examiner

*Primary Examiner* — Fritz Alphonse
(74) *Attorney, Agent, or Firm* — Harrington & Smith

(57) ABSTRACT

A method of transmitting data in a communication network is provided, wherein the method includes sending an error message indicating that a data packet transmitted using a cooperative transmission scheme on a first channel is not decoded correctly, and retransmitting the data packet using a second channel which is different from the first channel.

19 Claims, 4 Drawing Sheets

COMMUNICATION NETWORK ELEMENT AND METHOD FOR TRANSMITTING DATA

FIELD OF INVENTION

The present invention relates to the field of communication network elements and methods of transmitting data, in particular, to repeat transmission of data in a communication network. Furthermore, the present invention relates to a communication network system, a program element and a computer readable medium.

ART BACKGROUND

Nowadays mobile communication networks are widely used. These communication networks comprise a plurality of network cells each having at least one base station used to receive and transmit signals from user equipment, e.g. mobile phones or PDAs. A plurality of different environments or systems are known, e.g. GERAN, UTRAN, LTE, E-UTRAN, WCDMA, or WLAN. For ensuring a good performance and in particular a secure data transmission it has to be ensured that all data, data signals, or data packets are received at the intended recipient and at possible relay stations, like base stations of the mobile communication network.

One problem limiting the performance of the data transmission known in the prior art is inter cell interference. In order to reduce the inter cell interference some form of cooperative antenna (COOPA) systems are proposed. From theory significant performance gains with respect to capacity and coverage are known for full cooperating cellular radio systems compared to conventional ones. Due to these large gains, which cannot be achieved with other technologies, as it is known from theory that COOPA systems provide an upper bound for interference limited cellular radio systems. At the same time it is clear that full cooperation is not practical due to required channel state information (CSI) to a huge number of base stations (BS) and accordingly large feedback overhead, especially in case of FDD systems. A further topic is the large amount of data on the backbone network, which might generate a lot of costs in terms of CAPEX and OPEX.

Furthermore, in order to increase the transmission quality so called Hybrid Automatic Repeat Request (HARQ) error correction methods can be employed. When using HARQ the transmitting side consecutively transmits transmission time intervals (TTI) belonging to the HARQ processes. The receive side attempts to decode each process and sends back an acknowledge (ACK) or a non acknowledge (NACK) message or signal, upon which the transmit side either transmits new data in the process and retransmits the data transmitted in the previous cycle of the process, respectively. The receiver soft combines multiple receptions of the same data protocol data unit (PDU).

Within the framework of LTE blanking as well as non blanking HARQ retransmissions have been discussed in the context of MIMO, meaning if two data streams are transmitted and one data stream is already received correctly, this data stream will or will not wait till the HARQ process of the other data stream has been finalized.

For diversity with several transmit antennas based on space time block codes (STBC), HARQ schemes have been proposed, where for retransmission different space time block coding schemes are applied. This might be combined with mapping of data retransmissions to different resource blocks (RBs). The resulting effect is increased diversity gain.

However, these retransmissions may decrease the performance of the communication system, in particular of a cooperative antenna system.

Thus, there may be a need for a communication network element, a method for transmitting data, a communication network system, a program element, and a computer readable medium providing an improved performance of the communication network, in particular in a cooperative antenna system.

SUMMARY OF THE INVENTION

This need may be met by the subject-matter according to the independent claims. Advantageous embodiments of the present invention are described by the dependent claims.

According to an exemplary aspect of the invention a method of transmitting data in a communication network is provided, wherein the method comprises sending an error message indicating that a data packet transmitted using a cooperative transmission scheme on a first channel is not decoded correctly, and retransmitting the data packet using a second channel which is different from the first channel.

That is, for the retransmission another resource may be used as for the first transmission of the data packet. The communication network may be a mobile communication network and may be adapted to perform HARQ processes and/or the error message may be a Non ACKnowledge (NACK) message. In particular, the second channel may not be a cooperative channel, i.e. the second channel is no channel where cooperative transmission is performed but may be a channel which is specific to a transmission between a given user equipment (UE) and a corresponding base station or Node B. In particular, the second channel may be different to several or all channels used for a first transmission of a data packet, e.g. may be different to every channel used for a cooperative transmission.

According to an exemplary aspect of the invention a communication network element for transmitting data in a communication network is provided, wherein the network element comprises a detection unit adapted to detect an error message indicating that a data packet transmitted using a cooperative transmission scheme on a first channel is not decoded correctly, and a transmission unit adapted to retransmit the data packet using a second channel which is different from the first channel.

According to an exemplary aspect of the invention a communication network system is provided, which comprises a plurality of communication network elements, wherein the plurality of communication network elements includes at least two base stations and at least two user equipments, wherein at least one of the plurality of communication network elements is a communication network element according to an exemplary aspect of the invention, and wherein the plurality of communication network elements are adapted to perform a cooperative transmission of data packets. In particular, the communication network system may further comprise a central unit adapted to perform a common precoding for the at least two communication network elements, e.g. for two base stations or Node Bs.

According to an exemplary aspect of the invention a program element is provided, which, when being executed by a processor, is adapted to control or carry out a method according to an exemplary aspect of the invention.

According to an exemplary aspect of the invention a computer-readable medium, in which a computer program is stored which, when being executed by a processor, is adapted to control or carry out a method according to an exemplary aspect of the invention.

In this application the term "data packet" may particularly denote every kind of data which can be transmitted either via cable or line or wireless. In particular, the term "data" may include digital or analogue data relating to a phone call or a transmission of data as used in the connection with computer communications, e.g. programs, pictures, music title, or the like. In particular, the specific data may be formed by one or more data packets.

In this application the term "error message" may particularly denote every kind of message sent by a communication network element to one or a plurality of other communication network elements in case specific data, e.g. a data packet, is not received or decoded correctly at the intended recipient, e.g. due to low signal to noise ratio or due to low signal strength. Such an error message may be a NACK message in the case of a communication network element adapted to perform a so-called Hybrid Automatic Repeat Request (HARQ) error control method. In particular, an error message may be sent in case the specific data can not be decoded, e.g. information transmitted by this specific data is not recoverable.

The term "retransmitting" may particularly denote a second transmission of the data packet and/or the transmission of additional redundancy for the data packet. That is, the term "retransmitting" is not restricted to a pure repetition of the first transmission but means in a broader sense that the transmission is performed again in a way which is designed to increase the probability of a correct decoding of the data packet.

The term "channel" may particularly denote any kind of transmission path which can be used for transmitting data packets and which is distinguishable from another transmission path. That is, each "channel" may form a resource of the communication network which can be used to transmit data independently from other resources. Such a "channel" may be formed by a resource block (RB) comprising several subcarriers. For example, an RB may consist of 12 subcarriers point 14 OFDM symbols.

In contrast to known schemes a transmissions scheme according to an exemplary aspect of the invention may provide advantages with respect to reduced delay or reduced number of messages between scheduling entities at the cooperating Node Bs (NBs) of a cooperative area (CA) or distributed self organizing CAs (dCA) for the organization of HARQ retransmissions for cooperative antenna systems.

By providing a method of transmitting data which uses different channels for the "normal" transmission and the retransmission it may be possible to optimize the overall hybrid ARQ (HARQ) process for joint transmission (JT) precoding, specifically if there exist a delay between the involved NBs of the CA as is the case for dCAs or for inter NB cooperation, organized over the X2 interface.

By using a method according to an exemplary aspect of the invention it may be possible to even implement a cooperating system using HARQ retransmission which is more challenging than cooperating systems without any HARQ retransmissions. These cooperating systems without HARQ retransmission can be implemented much easier than systems with unpredictable retransmission requests from the UEs. The reason is that without HARQ retransmission the schedulers of the central units of the cooperating antenna system can be relatively easily synchronized based on data buffers and time stamps where the data blocks are just send out one after the other on pre allocated resource blocks. Only the precoder matrices have to be updated on a fast time basis to adapt to time varying radio channel conditions. However, due to the using of specific retransmission channels which are different to "normal" cooperative transmission channels, it may be possible to even implement HARQ retransmission in a cooperative transmission system while possibly avoiding any additional delay for HARQ retransmission in cooperating antennas systems over conventional ones and, at the same time, avoiding any additional time consuming and error prone messages between central units (CU) of the cooperative antenna system, e.g. between so called units mirror central units (mCUs), for organizing the HARQ retransmissions In particular, while using a method according to an exemplary aspect of the invention it may be possible to implement a simple and very robust scheme. Furthermore, delay critical messages leading to bad resource allocation due to time varying radio channels may be avoidable. Although the scheme is simple reliable and efficient data transmission may be guaranteed by HARQ retransmissions. In particular, it may be possible to ensure that for each UE there is only one NB responsible for the according HARQ processes, so the complicated alignment of HARQ process queues may be completely avoided. It should be noted that typically there will be up to 8 processes per QoS class and UE leading easily to misalignments at the different schedulers of the different NBs.

A gist of an exemplary aspect may be seen in providing a method of cooperative data transmission wherein a first transmission of a data packet is performed by using a first channel or resource, i.e. a cooperating channel, while, after receiving an error message indicating that the first transmission is not decoded correctly at the receiving side, the retransmission is performed using a second different channel or resource. This second channel is preferably a channel which is not used for cooperative transmission, i.e. may be a channel or resource which is specific for a communication or transmission path between a specific user equipment and the respective Node B.

Next, further exemplary embodiments of the method of transmitting data are described. However, these embodiments also apply to the communication network element, the communication network system, the program element, and the computer readable medium.

According to another exemplary embodiment of the method the second channel is orthogonal to the first channel. In particular, the second channel may also be orthogonal to additional channels which may be used for transmission or retransmissions of additional data packets. That is, it may be possible to provide more than two channels orthogonal to each other, so that for each transmission and/or retransmission a channel is used which is orthogonal to some or all other used channels. In particular, all channels used for retransmission purposes may be orthogonal to each other.

By using an orthogonal channel or resource for the retransmission a good channel quality may be guaranteed, even so only one Node B retransmits the data packet. In case of more than two channel or pre aligned RBs for retransmission these channel may also be orthogonal to RBs associated to other cooperative NBs, e.g. to RBs pre aligned for their respective retransmissions. Thus, it may be possible to ensure that the retransmission is not influenced by interference of these other cooperative NBs. Additionally it may be possible to implement a frequency reuse during the retransmission.

According to another exemplary embodiment of the method the second channel is partially orthogonal to the first channel. The term "partially orthogonal" may particularly denote the fact that the interference between the two channels may not be totally excluded but may at least be reduced. This may be achievable by decreasing the power used for the retransmission via the second channel leading to the fact that the interference is reduced.

According to another exemplary embodiment of the method the second channel is a non cooperative channel.

That is, the second channel may not be a cooperative channel, i.e. the second channel is no channel where cooperative transmission is performed but may be a channel which is specific to a transmission between a given user equipment and a corresponding Node B or base station. Thus, it may be possible to decouple the retransmission of the data packet from "normal" transmission of data packets, so that it may be possible to reduce time delay and synchronization problems which may occur in case that a cooperative channel would be used in which case not only the Node B and user equipment involved in the retransmission are blocked for further transmission of data. Additionally, it may be possible that a HARQ process is handled solely by that Node B where the user equipment is officially attached to.

According to another exemplary embodiment the method further comprises transmitting the data packet using the cooperative scheme. In particular, the transmitting may be a downlink transmission. For example, the data packet may be sent from a Node B to a user equipment by using a data signal.

According to another exemplary embodiment the method further comprises performing a common signal precoding before transmitting the data packet.

In particular, the common signal precoding may be a joint transmission in the downlink case and a joint detection in the uplink case. Such a join transmission or joint detection may basically be a matrix multiplication of all data signals for all cooperating UEs with a precoding matrix W.

According to another exemplary embodiment of the method the common signal processing is performed by a plurality of Node Bs involved in the cooperative transmission scheme.

In particular, all or at least several involved Node Bs of a cooperation area (CA) may be time and/or frequency synchronized. For example, the time and/or frequency synchronization may be performed within a fraction of a guard interval of OFDM symbols and/or a small fraction of a subcarrier bandwidth. Preferably, same local oscillators may be used for all or at least several involved Node Bs of the CA. Thus, it may be possible to minimize degradations due to frequency-offsets and/or phase noise fluctuations.

In particular, a central unit (CU) may be foreseen for cooperative antenna (COOPA) systems to perform a joint precoding and—as the name suggests—may be placed at a central point of the so called cooperation area (CA) at one of the cooperating Node Bs (NBs). The other cooperating NBs may be connected to this CU by fast and low delay fiber connections.

The CU may perform in downlink (DL) common signal precoding like joint transmission, which is basically a matrix multiplication of all data signals for all cooperating UEs with a precoding matrix W. In case of zero forcing (ZF) W is the pseudo inverse $H^+$ of the overall channel matrix H. In the simplest form of a SA for a codebook based precoding the precoding matrix W may be selected from a codebook based on the different PMI feedbacks PMI1 and PMI2 from the UEs UE1 and 2. Similar concepts may be applied to the uplink (UL) as well, often denominated as joint detection (JD).

Compared to conventional CAs there may also exist distributed self organizing CAs (dCA) having not only a single CU for common signal processing, but at each cooperating NB a so called mirror CU (mCU). If each mCU will do exactly the same processing with the same precoding matrix W on the same user data for calculation of the transmit signals, than the resulting transmission may be the same as for the conventional solution with a single CU.

According to another exemplary embodiment of the method the data packet is transmitted in a time frame, and the time frame starts of Node Bs involved in the cooperative transmission scheme are synchronized.

That is, the cooperative transmission may be based on a time frame transmission and the time frame starts and/or numbers of all or at least several Node B involved in the transmission may be synchronized at the beginning of the transmission or during the data transmission. For example, the synchronization may be performed within a fraction of a guard interval of OFDM symbols and/or a small fraction of a subcarrier bandwidth. Each time frame may comprise or may consist of several sub frames of a given time length, e.g. 1 ms similar to what is specified in LTE R8.

According to another exemplary embodiment the method further comprises pre aligning a specific channel for the second channel.

In particular, the pre aligning may be performed before a first transmission of the data packet or even before starting a cooperative transmission. That is, for each user equipment and/or corresponding Node B may be a specific resource pre aligned which may be used in case that the data packet is not correctly decoded, i.e. an error message occurs. This pre aligned channel or resource may be orthogonal to the first channel and may be used directly for retransmission if a user equipment sends a NACK message indicating a not decoded data packet. In particular, one or a plurality of specific channels may be pre aligned to each connection between a specific user equipment and the respective Node B. The plurality of pre aligned channels may be stored in the form of a list or look up table and may be sorted according to a specific criterion, e.g. according to the performance or quality of the respective channel.

According to another exemplary embodiment of the method the specific channel is chosen according to a predefined criterion. In particular, the predetermined criterion may be a performance level of the respective channel. Thus, it may be possible to pre align or reserve that second channel for a retransmission which may ensure a high probability of a decodable retransmission of the data packet.

According to another exemplary embodiment the method further comprises, deciding whether a retransmission has to be performed via the pre aligned second channel and/or releasing the second channel in case it is determined that no retransmission has to be performed. The releasing of the second channel may be a releasing of the second channel itself or may be restricted to releasing to some resource blocks allocated for the second channel.

By providing the possibility of releasing a pre aligned or pre allocated second channel in case it is not necessary for a retransmission it may be possible to use it for another transmission, e.g. for a transmission between a NodeB and a user equipment not participating in the cooperative transmission. Thus, the using of resources may be more efficient.

According to another exemplary embodiment the method further comprises, allocating a plurality of resource blocks to the second channel.

According to another exemplary embodiment of the method the number of allocated resource blocks is determined based on current conditions of a respective cell of the communication network. In particular, the current conditions may be the cell load, the mean number of retransmissions, the number of user equipments in COOPA mode, channel conditions or the like.

According to another exemplary embodiment the method further comprises, sending a message indicating the plurality of allocated resource blocks. In particular, the message may be adapted to enable an agreeing on the current resource blocks used or allocated for retransmission between cooperative Node Bs.

Next, further exemplary embodiments of the communication network element are described. However, these embodiments also apply to the method of transmitting data, the communication network system, the program element, and the computer readable medium.

According to another exemplary embodiment of the communication network element the communication network element is one out of the group of network elements consisting of: a Node B, a user equipment, a base station, and a relay node.

Summarizing an exemplary aspect of the present invention may be the providing of HARQ retransmissions in cooperative antenna systems. Preferably, after user grouping a central scheduler of a central unit may decide to set for some of the resource blocks (RBs) two UEs into cooperation mode, meaning that both UEs are supported on the same RBs simultaneously and with proper precoding to minimize inter UE interference. All involved NBs of the CA may be time and frequency synchronized. The transmitted data of all UEs are buffered so that varying arrival times of the data packets from the backbone communication network can be compensated and all NBs may have always all data available for precoding and transmission.

In case that one of the UEs cannot decode one of its data packets and send a retransmission request, according to conventional processes the whole process would be confused requiring difficult alignment procedures to organize a common retransmission of that data packet. To avoid this there may be for each UE pre aligned RBs, orthogonal to that for cooperative transmission, which can be used directly for retransmission if a UE sends a NACK message for not decoded data packet. This possibly decouples the HARQ retransmissions from normal data transmission completely. Additionally the HARQ process may be handled solely by that NB where the UE is officially attached to. Thus, due to the allocation of orthogonal resources a good channel quality may be guaranteed, even so only one NB retransmits the data.

The exemplary aspects and exemplary embodiments defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
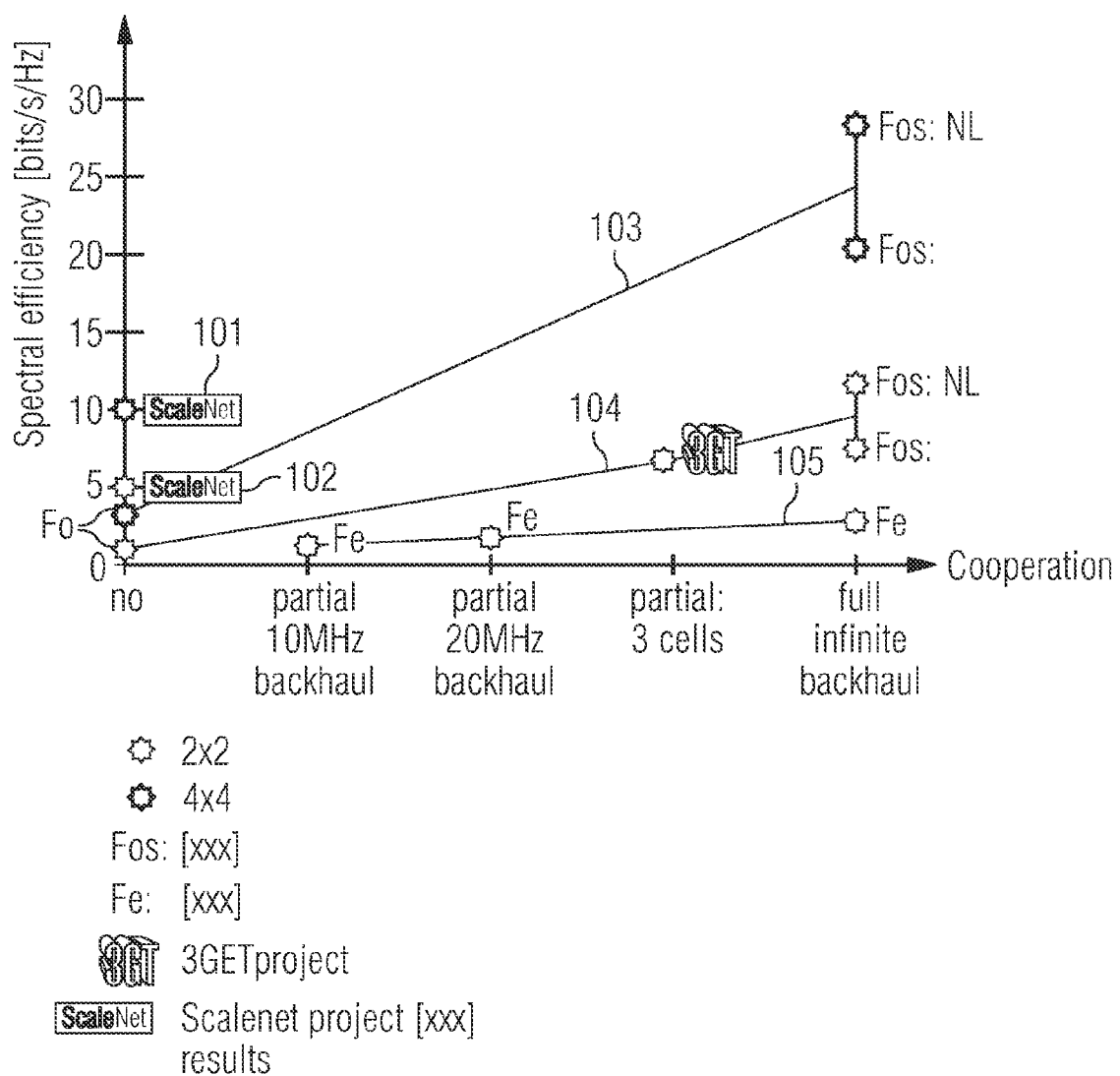
FIG. 1 schematically illustrates potential gains for different degrees of cooperation.

The illustration in the drawing is schematically. Identical or similar elements are labeled with identical or similar reference signs.

In the following, referring to FIGS. 1 to 4, some basic principles of a method of transmitting data and communication network elements according to exemplary embodiments will be explained.

FIG. 1 schematically illustrates potential gains for different degrees of cooperation. That is, FIG. 1 shows the spectral efficiency in bits per seconds and hertz (bits/(s*Hz)) over different levels of cooperation. In particular, several schemes are depicted for several degrees of cooperation. The spectral efficiency for the "ScaleNet" results 101 and 102 represent the results for optimum MU-MIMO systems without cooperation but with full channel state information (CSI) knowledge. Furthermore, the "Fo" lines 103 and 104 represent the theoretical upper bounds for each level of cooperation, while the line "Fe" 105 represents the results for a 5 MHz system with varying data rate on X2 between cooperating Node Bs. Form FIG. 1 it can be clearly seen that the spectral efficiency increases with increasing level of cooperation. This is in particular, the case for the "Fo" lines but the "Fe" line 105 as well increases from no cooperation over a cooperation corresponding to 10 MHz backhaul, 20 MHz backhaul, 3 cells and full, i.e. infinite backhaul. Additionally, the result for the 3GETproject is indicated by 106 which represents an active IF management scheme with cooperative areas (CAs) of size 3.

Figure 2:
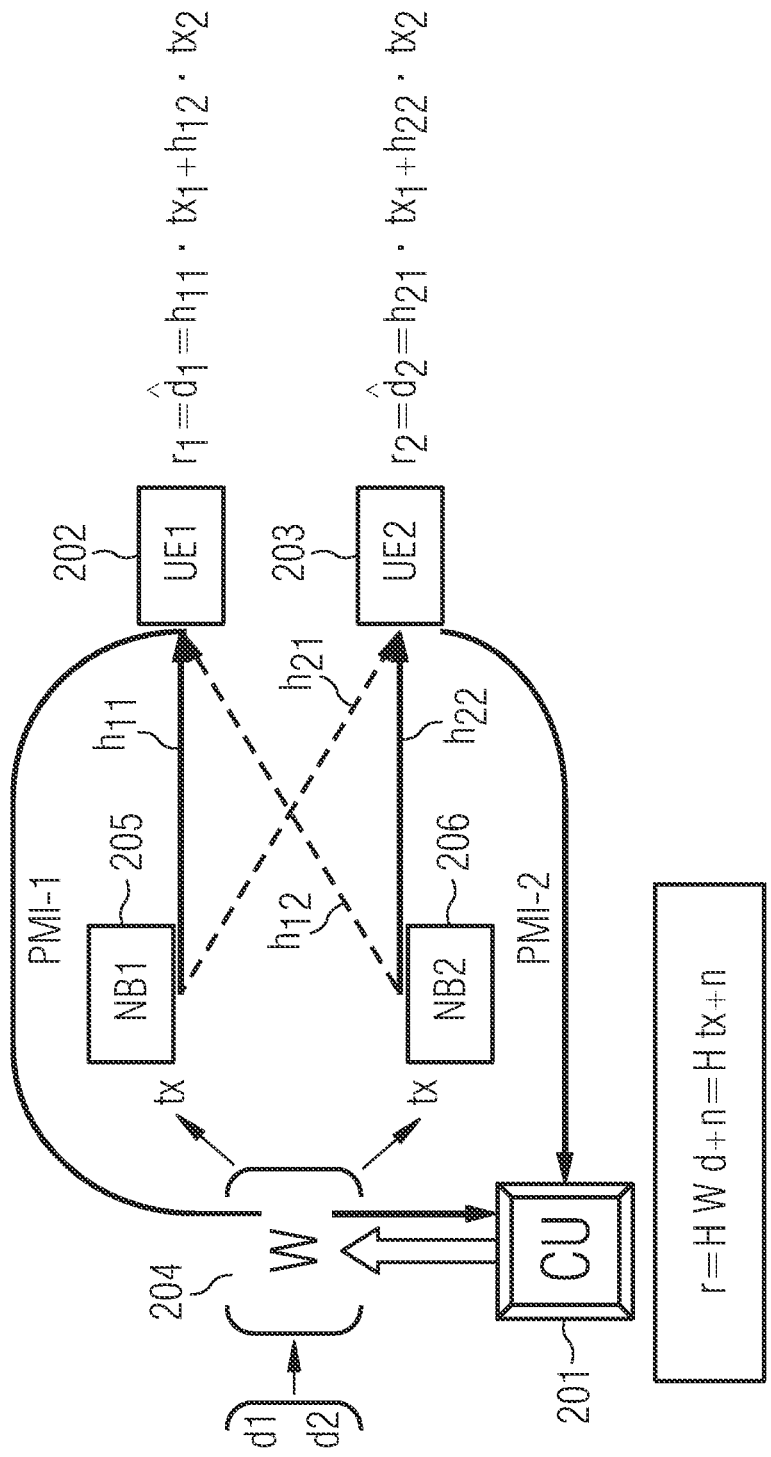
FIG. 2 schematically illustrates a basic solution for cooperative transmission.

FIG. 2 schematically illustrates a basic solution for cooperative transmission which is helpful for the understanding of the present invention. In particular a central unit (CU) 201 performs in downlink (DL) common signal precoding like joint transmission, which is basically a matrix multiplication of all data signals for all cooperating UEs with a precoding matrix W. In case of zero forcing (ZF) W is the pseudo inverse $H^+$ of the overall channel matrix H. The simplest form of a SA for a codebook based precoding is illustrated in FIG. 2. In this case, the precoding matrix W is selected from a codebook based on the different PMI feedbacks PMI1 and PMI2 from the UEs UE1 and 2. Similar concepts can be applied to the uplink (UL) as well, often denominated as joint detection (JD).

In particular, FIG. 2 shows data packets d1 and d2 to be transmitted to UE1 202 and UE2 203. For the common signal processing the data packets are encoded by using the matrix W 204 to form the data signals tx to be transmitted to Node B1 205 corresponding to UE1 202 and Node B2 206 corresponding to UE2 203, where signals $r_1$ and $r_2$ are received, respectively. The signals $r_1$ and $r_2$ correspond to the multiplication of the channel matrix H, the pseudo inverse $H^+$ or W and the data d to be transmitted offset by an offset n.

Figure 3:
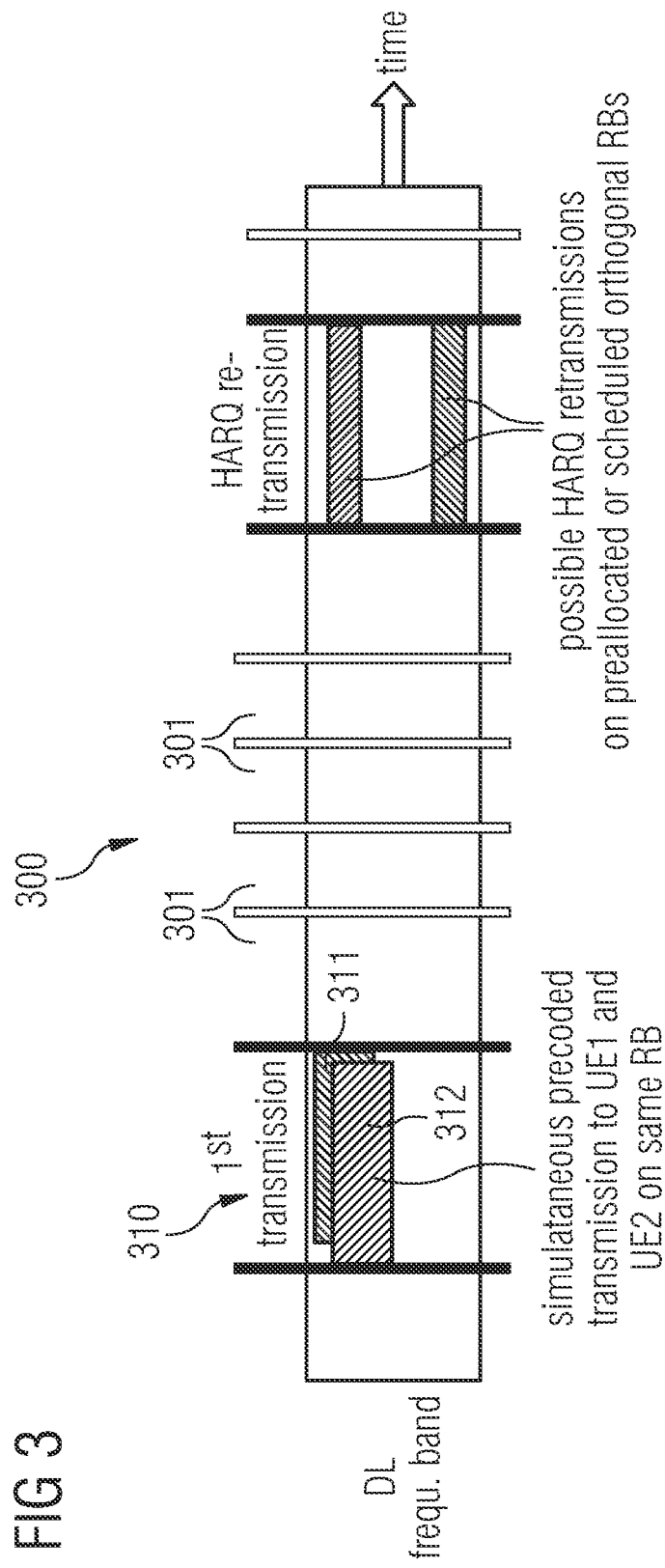
FIG. 3 schematically illustrates a HARQ scheme according to an exemplary embodiment of the invention.

FIG. 3 schematically illustrates a HARQ scheme according to an exemplary embodiment of the invention. In connection with FIG. 3 a basic idea of an exemplary embodiment of the invention for a HARQ retransmission in cooperative antenna systems of any kind will be explained in more detail.

In FIG. 3 a typical time frame 300 consisting of several sub frames 301 of length 1 ms is depicted, similar to what is specified in LTE R8. Shown is the DL frequency band containing e.g. in case of a 20 MHz bandwidth 100 resource blocks (RBs), where each RB consists of 12 subcarrier (SC) point 14 OFDM symbols.

For the described method it is assumed that after user grouping a central scheduler of the central unit has decided to set some of the RBs of two UEs into cooperation mode, meaning that both UEs are supported on the same RBs simultaneously and with proper precoding to minimize inter UE interference.

All involved NBs of the cooperating area (CA) are time and frequency synchronized within fraction of the guard interval of the OFDM symbols and a small fraction of a SC bandwidth of 15 kHz. Preferably, the same local oscillator (LO) should be used for all NBs of the CA to minimize degradations due to frequency-offsets and phase noise fluctuations. Specifically also the frame starts of all involved NBs are synchronized and all NBs transmit the same frame number.

Figure 4:
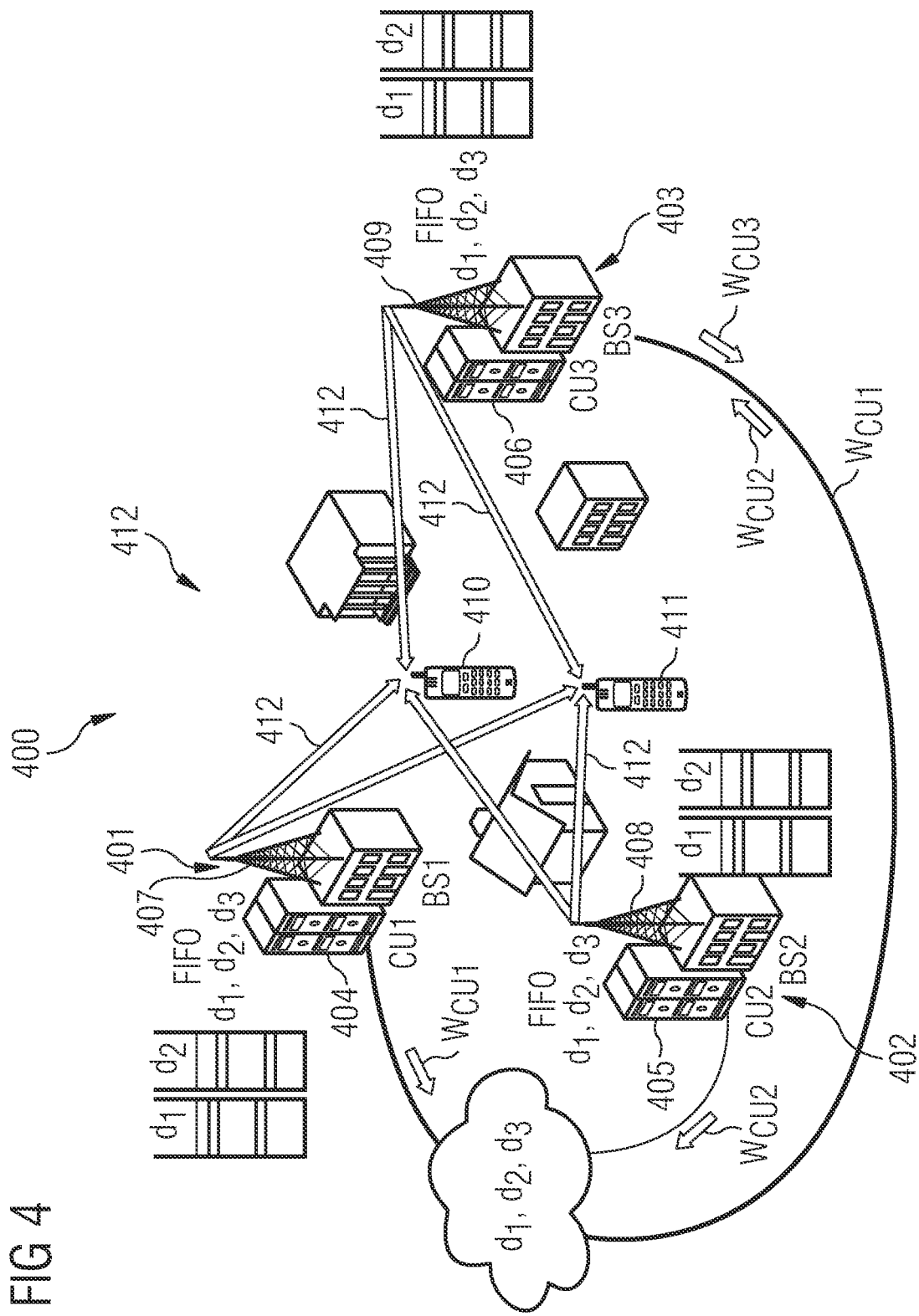
FIG. 4 schematically illustrates a distributed self organizing cooperation area.

In case of mirror central units (mCUs) distributed over several NBs possibly at far off locations the data buffers for user data may be synchronized as well, which may be done by suitable time stamps, which have to be inserted into the data streams within the backbone network before multicasting the data to all UEs. The Tx data of all UEs may be buffered so that varying arrival times of the data packets from the backbone network can be compensated and all NBs have always all data available for precoding and transmission. The basic concept of a distributed self organizing CA (dCA) is illustrated in FIG. 4.

As long as there are no retransmissions at each new subframe all NBs will fetch one data packet per UE from there time aligned data queues. Time alignment may be regularly checked and corrected if necessary due to some seldom error events or at start of the cooperative transmission based on the inserted time stamps. This is labelled in FIG. 3 as first transmission 310 where the different areas 311 and 312 mark the simultaneous cooperative transmission to several UEs on the same RB.

The main goal of the described method is now to continuously transmit new data packets without further message exchanges between the involved NBs by just fetching one set of data packets after the other for cooperative transmission similar to un-acknowledged UDP protocols. In case that one of the UEs cannot decode one of its data packets and send a retransmission request, the whole process would be confused requiring difficult alignment procedures to organize a common retransmission of that data packet when a known method would be used.

However, in order to avoid this confusion according to the described method according to an exemplary embodiment of the invention there are for each UE pre aligned or pre allocated RBs, orthogonal to that for cooperative transmission, which can be used directly for retransmission if a UE sends a NACK message for a not decoded data packet. Furthermore, the pre aligned RBs for retransmission may also be orthogonal to RBs associated with other cooperative NBs, e.g. to RBs pre aligned for their respective retransmissions. Thus, it may be possible to ensure that the retransmission is not influenced by interference of these other cooperative NBs. This may decouple the HARQ retransmissions from normal data transmission completely. Additionally the HARQ process will be handled solely by that NB where the UE is officially attached to.

Due to the allocation of orthogonal resources a good channel quality may be guaranteed, even so only one NB retransmits the data.

As retransmission occur typically only for about 10% or less of the data transmissions the overall performance loss compared to a system using user cooperation for HARQ retransmissions as well may be small. Anyway for a system as using a method according to the invention it might be useful to set the target for the block error rate (BLER) to a smaller value so that retransmissions happen more seldom compared to conventional systems. This may be outweighed by the significant performance gains due to cooperation itself.

Those RBs pre-allocated for retransmissions may be used by UEs not in cooperation mode, in case these resources are not required for a retransmission. It should be noted that only part of the UEs will be in cooperation mode as e.g. UEs at cell centre will typically not profit from cooperation.

FIG. 4 schematically illustrates a distributed self organizing cooperation area. In particular, FIG. 4 schematically shows a distributed self organizing cooperation area (dCA) 400 with multicasting of data to 3 mirror central units (mCUs) 401, 402 and 403 each having a respective data buffer 404, 405 and 406, respectively, for data packets d1 to d3. Each mCU is associated to a base station 407, 408 and 409 respectively, which communicate with two UEs 410 and 411 which is indicated by the arrows 412.

Summarizing some of the main advantages of a method according to an exemplary embodiment may be:
a) The proposed HARQ scheme results in a very simple implementation concept for cooperative antenna systems. Ideally and in the simplest case there would be no need at all to exchange scheduling decisions during cooperation phase. Except during setup of the cooperation, where a set of RBs for cooperation based on long term channel state information (CSI) may have to be defined and a starting time may have to be distributed, transmitting of one data block after the other can be done without further notifications. Based on the time stamps and the common known set or RBs the NBs start precoding of the data at exactly that time stamp in the predefined frame number on the agreed RBs and continues till it receives an 'end' message, e.g. because one of the UEs has left the cell.
b) Due to the simple scheme a very robust implementation may be possible.
c) Delay critical messages leading to bad resource allocation due to time varying radio channels may be avoided.
d) In spite of the simple scheme reliable and efficient data transmission may be guaranteed by HARQ retransmissions.
e) For each UE there is only one NB responsible for the according HARQ processes, so the complicated alignment of HARQ process queues may completely be avoided.
f) As there is only one NB handling the HARQ processing per UE significant memory space may be saved compared to a cooperative transmission of HARQ messages, where each of the NBs would have to implement all HARQ queues for all UEs.
g) As no alignment of scheduling decisions is required between different NBs, precious time may be saved guaranteeing that HARQ retransmissions are done as fast as possible.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS

101 ScaleNet results
102 ScaleNet results
103 Fo result
104 Fo result
105 Fe result
201 Central unit
202 User equipment 1
203 User equipment 2
204 Matrix
205 Node B1
206 Node B2
300 Time frame 301 Sub frames
310 First transmission
311 Different area
312 Different area
306 Transmission
307 Transmission
308 Transmission
309 Transmission
310 Transmission
311 Transmission
400 Distributed self organizing cooperation area
401 Mirror central unit 1
402 Mirror central unit 2
403 Mirror central unit 3
404 Data buffer 1
405 Data buffer 2
406 Data buffer 3
407 Node B1
408 Node B2
409 Node B3
410 User equipment 1
411 User equipment 2
412 Communication

The invention claimed is:

1. A method of transmitting data in a communication network, the method comprising:
  detecting, by a first network element, an error message from a second network element indicating that a data packet transmitted to said second network element using a cooperative transmission scheme on a first channel is not decoded correctly,
  retransmitting, by the first network element, the data packet to said second network element using a second channel which is different from the first channel, and
  performing a common signal precoding before transmitting the data packet,
  wherein the common signal precoding is performed by a plurality of Node Bs involved in the cooperative transmission scheme.

2. The method according to claim 1, wherein the second channel is a noncooperative channel.

3. The method according to claim 1, wherein the second channel is orthogonal to the first channel.

4. The method according to claim 1, further comprising:
  transmitting the data packet using the cooperative scheme.

5. The method according to claim 1, wherein the data packet is transmitted in a time frame, and wherein time frame starts of Node Bs involved in the cooperative transmission scheme are synchronized.

6. The method according to claim 1, further comprising:
  pre-aligning a specific channel for the second channel.

7. The method according to claim 1, further comprising:
  allocating a plurality of resource blocks for the second channel,
  wherein the number of allocated resource blocks is determined based on current conditions of a respective cell of the communication network.

8. The method according to claim 7, further comprising:
  sending a message indicating the plurality of allocated resource blocks.

9. A communication network element for transmitting data in a communication network, the network element comprising:
  a detection unit adapted to detect an error message from a second network element indicating that a data packet transmitted by said network element using a cooperative transmission scheme on a first channel is not decoded correctly, and
  a transmission unit adapted to retransmit the data packet to said second network element using a second channel which is different from the first channel,
  wherein a common signal precoding is performed before transmitting the data packet by a plurality of Node Bs involved in the cooperative transmission scheme.

10. The communication network element according to claim 9, wherein the network element is one out of the group of network elements consisting of:
  a Node B,
  a user equipment,
  a base station, and
  a relay node.

11. A computer program product comprising a non-transitory computer-readable medium bearing computer program code embodied therein for use with a computer, the computer program code comprising code for performing the method according to claim 1.

12. An apparatus comprising:
  one or more processors; and
  one or more memories including computer program code, the one or more memories and the computer program code configured, with the one or more processors, to cause the apparatus to perform at least the following:
  detecting an error message from a network element indicating that a data packet transmitted to said network element using a cooperative transmission scheme on a first channel is not decoded correctly, and
  retransmitting the data packet to said network element using a second channel which is different from the first channel,
  wherein a common signal precoding is performed before transmitting the data packet by a plurality of Node Bs involved in the cooperative transmission scheme.

13. The apparatus as claimed in claim 12, wherein the network element is one out of the group of network elements consisting of:
  a Node B,
  a user equipment,
  a base station, and
  a relay node.

14. The apparatus as claimed in claim 12, wherein the second channel is a noncooperative channel.

15. The apparatus as claimed in claim 12, wherein the second channel is orthogonal to the first channel.

16. The apparatus as claimed in claim 12, wherein the data packet is transmitted in a time frame, and wherein time frame starts of Node Bs involved in the cooperative transmission scheme are synchronized.

17. The apparatus as claimed in claim 12, wherein the one or more memories and the computer program code are further configured, with the one or more processors, to cause the apparatus to perform:
  pre-aligning a specific channel for the second channel.

18. The apparatus as claimed in claim 12, wherein the one or more memories and the computer program code are further configured, with the one or more processors, to cause the apparatus to perform:
  allocating a plurality of resource blocks for the second channel,
  wherein the number of allocated resource blocks is determined based on current conditions of a respective cell of a communication network.

19. The apparatus as claimed in claim 18, wherein the one or more memories and the computer program code are further configured, with the one or more processors, to cause the apparatus to perform:

sending a message indicating the plurality of allocated resource blocks.

\* \* \* \* \*